July 17, 1934.  G. F. YAGER ET AL  1,966,941
MOLDING MACHINE
Original Filed Aug. 31, 1931    4 Sheets-Sheet 1

Inventors
George F. Yager
Oliver J. Heath

Attorneys

July 17, 1934.  G. F. YAGER ET AL  1,966,941
MOLDING MACHINE
Original Filed Aug. 31, 1931   4 Sheets-Sheet 3

Inventors
George F. Yager
Oliver J. Heath

July 17, 1934.   G. F. YAGER ET AL   1,966,941
MOLDING MACHINE
Original Filed Aug. 31, 1931   4 Sheets-Sheet 4

Inventors
George F. Yager
Oliver J. Heath

By Whittmore, Hulbert Whittmore
& Belknap

Attorneys

Patented July 17, 1934

1,966,941

UNITED STATES PATENT OFFICE 1,966,941

MOLDING MACHINE

George F. Yager and Oliver J. Heath, Toledo, Ohio, assignors to The Bunting Brass and Bronze Company, Toledo, Ohio, a corporation of Ohio Original application August 31, 1931, Serial No. 560,464. Divided and this application June 1, 1932, Serial No. 614,769

13 Claims. (Cl. 22—25)

This invention relates generally to molding machines and constitutes a division of our application filed August 31, 1931 and bearing Serial Number 560,454.

Figure 1:
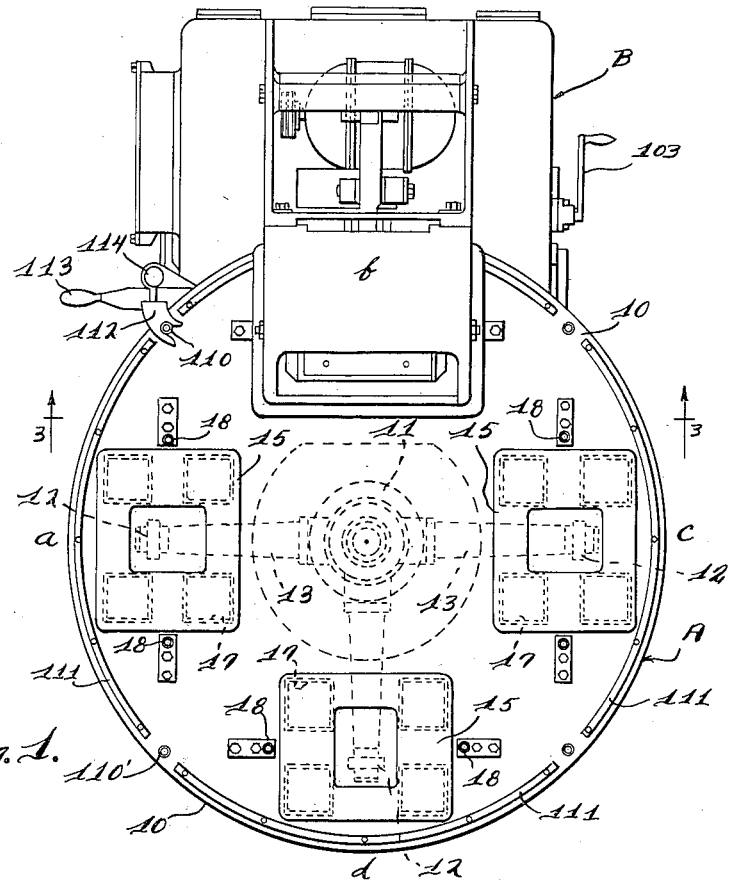
Figure 1 is a top plan view of a machine constructed in accordance with the teachings of this invention.
Figure 2:
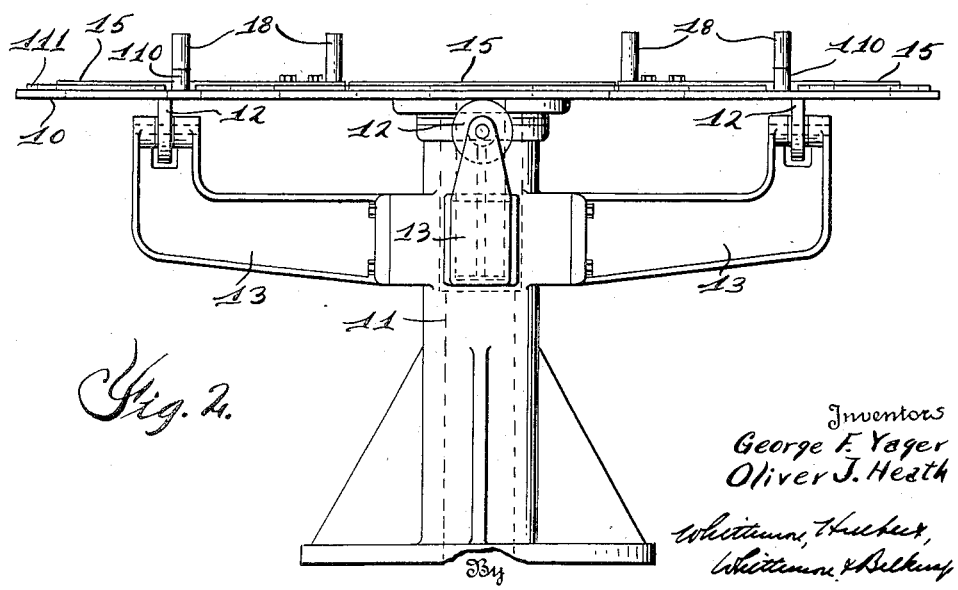
Figure 2 is a side elevational view of a portion of the machine shown in Figure 1.

Referring now to the drawings, A is a conveyor and B is the mold forming mechanism of a machine embodying our invention. As shown, the conveyor A is preferably in the form of a circular table or dial 10 and is rotatably supported on a pedestal 11. Preferably the dial rests on rollers 12 journaled in the ends of arms 13 which project radially from the pedestal 11 adjacent the upper end thereof. Three of these arms are provided, the dial being supported on its fourth side by other means which will hereinafter be more fully described.

The dial 10 is mounted for movement about its axis to four stations designated by the reference characters a, b, c and d in Fig. 1 of the drawings. It is contemplated that the flask will be positioned on the dial at the station a and filled with sand. The dial will then be rotated to position the flask at station b which is adjacent the mold forming machine B. When the flask is in this station, the mold will be formed in the flask, as will hereinafter be described. The flask will then be moved to station c where, if the machine is used for forming the drag of the mold, the cope of the mold may be placed upon the top of the drag, after which the drag and cope may then be removed from the dial and placed on a suitable conveyor (not shown) so as to be conducted to the molding room or the like. The station d is idle.

Since there are four stations to which the dial may be moved, four platforms or supporting plates 15 are secured to the top of the dial, these plates being spaced circumferentially of the dial so that one platform is located at each station, and each platform is movable upon rotation of the dial successively to the several stations. A pair of pins 18 are also fixed to the upper face of the dial adjacent each supporting plate 15 and on opposite sides thereof, as clearly illustrated in Fig. 1 of the drawings, to facilitate the positioning of flasks on the plates, as will hereinafter be more fully brought out.

The mold forming machine B comprises a supporting base and housing 25 arranged at one side of the rotatable dial 10. Mounted on this housing is a motor 26 which rotatably drives a pulley 27 fixed to a shaft 28. This shaft is journaled in the side walls of chamber 29 formed within the housing 25 and projects laterally beyond this chamber where it is operatively connected to change speed gears designated generally by the reference character 30. The change speed gears are readily accessible from one side of the housing, being enclosed in a suitable chamber which is provided with a removable cover 30'. The reduction gearing 30 is arranged to rotatably drive a second shaft 31 journaled in the housing 29, and this shaft is connected by suitable reduction gearing designated generally by the reference character 32 to a gear 33 which is rotatably journaled on a shaft 34 mounted for rotation in the housing 25.

The gear 33 is provided on its one face with a clutch member 35 arranged to be engaged by a clutch member 36 formed on a sleeve 37 which is slidably keyed to the shaft 34. The sleeve 37 is provided on its opposite ends with ribs or raised portions 38 and 39, which provide oppositely facing shoulders on opposite sides of a channel 40 formed substantially centrally of the said sleeve. This channel is provided intermediate its ends with a circular recess 41 arranged to be engaged by the head 42 of a plunger 43 mounted for vertical reciprocation in the housing 25. A spring 44 normally urges the plunger downwardly to engage the head in the recess, while a lever 45 pivoted as at 46 within the housing is connected to the upper end of the plunger to provide means for raising the same against the tension of the spring 44.

The portion 39 of the sleeve 37 is provided with a cam face 47 arranged to engage the head of the plunger during rotation of the sleeve so that the sleeve is moved longitudinally of the shaft 33 to register the head of the plunger with the recess 41. A spring 48 is provided for normally urging the sleeve 37 into clutching engagement with the gear 33.

Figure 3:
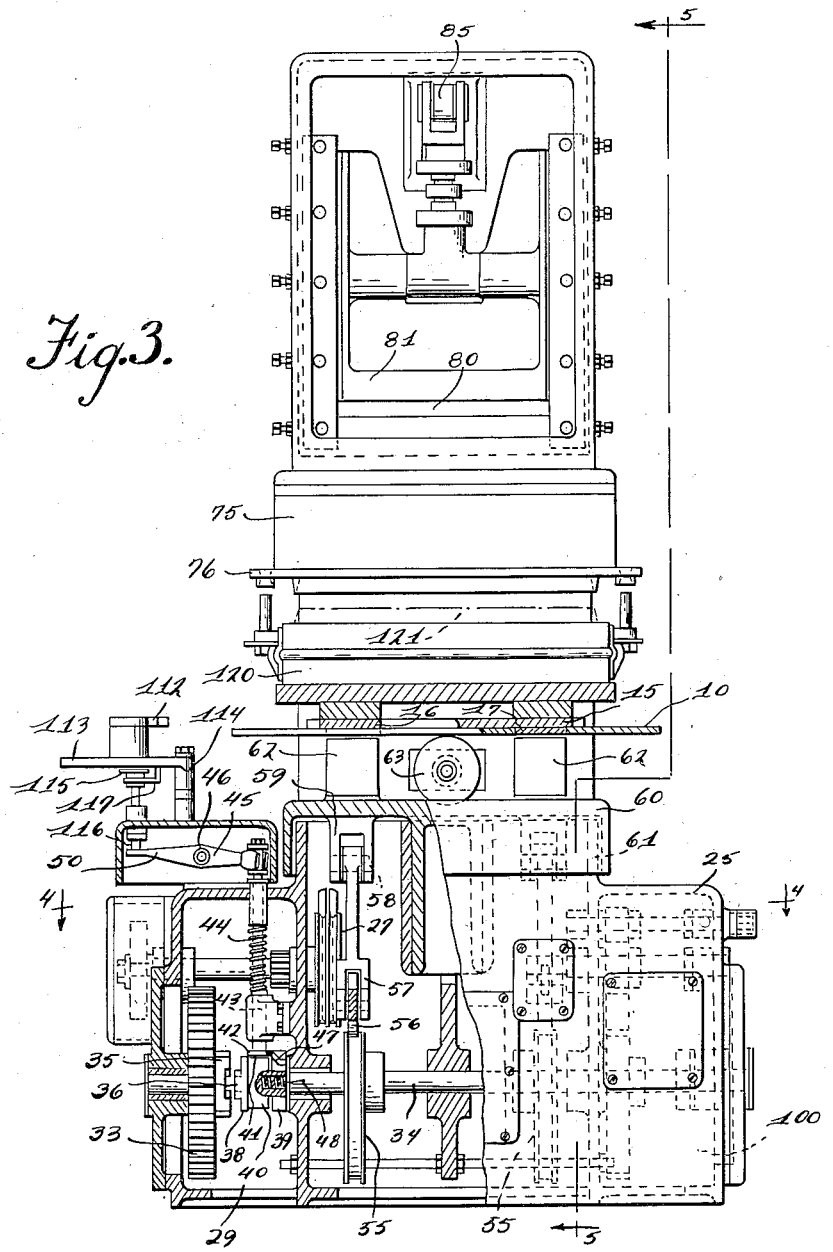
Figure 3 is a sectional view taken substantially on the line 3—3 of Figure 1.

The operation of this clutch mechanism is as follows. The head of the plunger engaging the recess 41 holds the clutch member in the disengaged position shown in Fig. 3 of the drawings. If, however, the plunger is momentarily raised by depressing the end 50 of the lever 45, the head of the plunger is raised to a position out of engagement with the shoulder on the rib 39, and the clutch member is moved to the left, as viewed in Fig. 3 of the drawings, by the spring 48 to engage the clutch portion 36 thereof with the clutch portion 35 of the gear 33. The shaft 34 is thus connected to the gear 33 and is rotated therewith. Toward completion, however, of one revolution of the shaft 34, the head of the plunger is engaged by the cam face 47, and the sleeve is moved to the right or to disengaged position, which will be readily apparent. When the clutch member has been completely disengaged, the head of the plunger will be in engagement with the recess 41 in the clutch member so that the shaft 34 will be locked against rotation until the plunger 43 is again raised.

Figure 5:
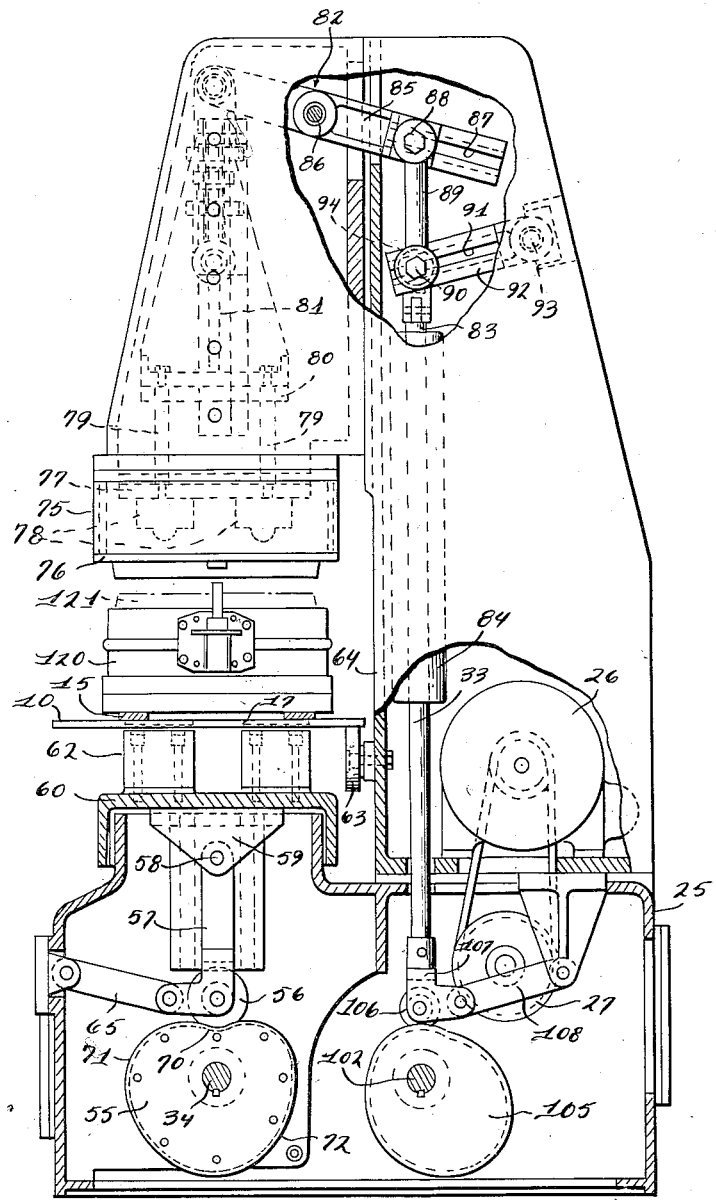
Figure 5 is a vertical sectional view taken substantially on the line 5—5 of Figure 3.

Fixed to shaft 34 for rotation therewith are a pair of cams 55. Engaging the cam surface of each cam is a roller 56 rotatably journaled in a link 57 pivoted as at 58 to ears 59 which depend from a squeeze table or the like 60. This table is mounted for vertical reciprocation on a boss 61 formed on the housing 25 and is provided on its upper face with blocks 62 arranged to be projected through openings 17 in the dial and against the under side of supporting plates 15 when the latter are brought into the station b. It will be noted that a roller 63 is provided for rotatably supporting the dial adjacent the blocks 62, this roller being carried by an upright 64 on the base 25. The link 57 is preferably pivotally supported by a link 65 from the side of the housing 25, as clearly illustrated in Fig. 5 of the drawings.

Each cam 55 is provided with a depressed portion 70, a raised portion 71, and a portion 72 of greater radius than the portion 71. The arrangement is such that upon the rotation of the cams for one revolution, the table 60 will be first raised a slight amount and held in this raised position during a portion of the rotation of the shaft 34 and will then be raised further and held in this raised position for the remainder of the rotation of the shaft 34 or until the rollers 56 again engage the depressed portions 70 in the cams, at which time the table will be lowered to the position shown in Fig. 5 of the drawings.

Supported by the upright 64 and in vertical alignment with and above the blocks 62 is a pattern housing 75 provided at its lower edge with a pattern stripper plate 76. Mounted for vertical reciprocation within housing 75 is a pattern plate 77 carrying patterns 78 of any suitable design. The pattern plate is connected by plungers 79 to a cross head 80, and fixed to this cross head is a link 81 which projects upwardly to a point adjacent the top of the upright 64. The link 81 is operatively connected by suitable adjustable levers designated generally by the reference character 82 to an actuating arm 83 provided with the counterweight 84. The adjustable levers may comprise a link 85 pivoted as at 86 and provided with a dovetailed slot 87 adjacent its free end. Adjustably mounted in this slot is a bolt 88 which is pivotally connected to the upper end of a link 89. The lower end of this link is pivotally connected to a bolt 90, the head of which engages in a dovetailed slot 91 formed in a link 92 pivoted as at 93 to the upright 64. The actuating arm 83 is pivotally connected to link 92 as at 94, the arrangement being such that by properly adjusting the bolts 88 and 90 in the slots 87 and 91, respectively, the travel of the pattern plate 80 incident to a predetermined movement of the actuating arm may be varied.

Figure 4:
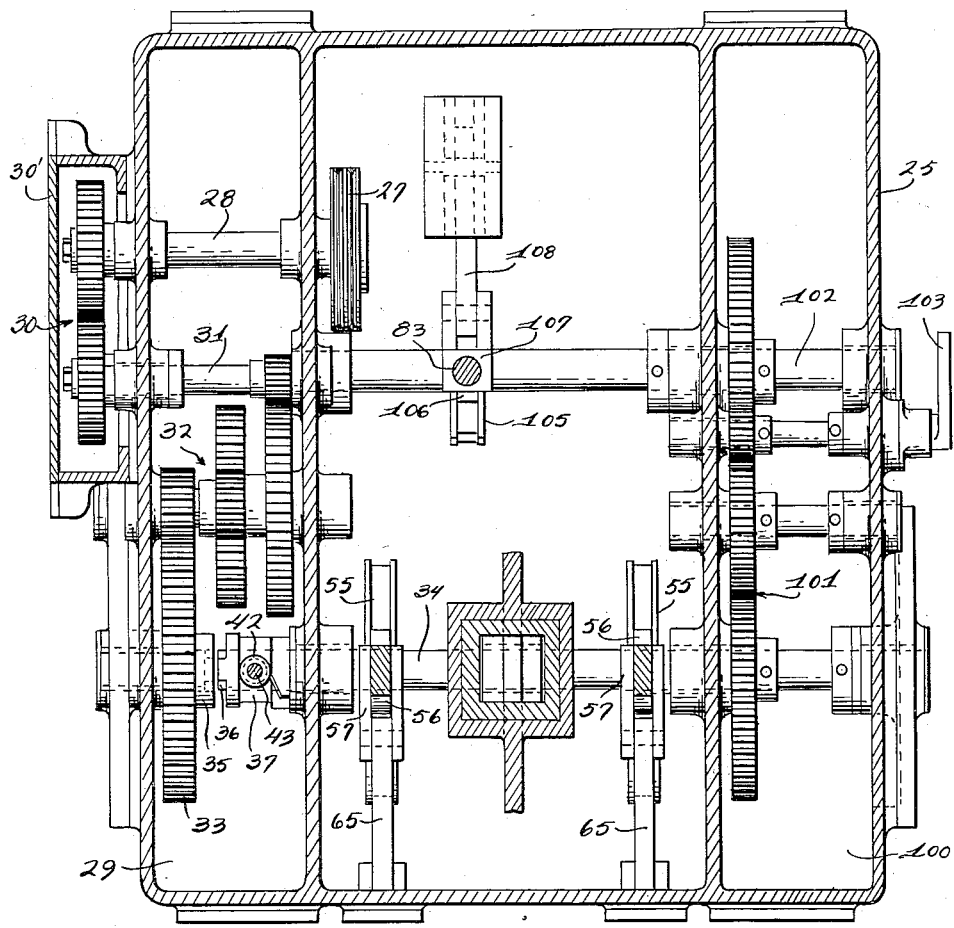
Figure 4 is a horizontal sectional view taken substantially on the line 4—4 of Figure 3.

Referring to Fig. 4 of the drawings, it will be noted that the shaft 34 projects into a chamber 100 formed in the base 25 and, by means of suitable reduction gearing designated generally by the reference character 101, drives a second shaft 102 which is arranged parallel with the shaft 34. The hand crank 103 fixed to one of the shafts of the reduction gearing 101 provides means for initially setting the machine for proper operation, as will hereinafter be more fully described.

Fixed to shaft 102 is a cam 105, and engageable with the cam surface of this cam is a roller 106 which is rotatably journaled in a bracket 107 fixed to the lower end of the actuating arm 83. The link 108 pivotally connected at its ends to the housing 25 and to the bracket 107, provides means for holding the bracket in position.

It will be understood that whenever the shaft 34 is rotated, the shaft 102 will also be rotated, and the cam 105 will be actuated to raise the arm 83 and to thus force the pattern plate 77 downwardly within the housing 75. The cam is so arranged that the pattern plate will be moved downwardly a sufficient distance to force the patterns into the sand within the flask and will then permit raising of the pattern plate by the counterweight 84 to a position where the patterns are out of the flask.

The invention contemplates the provision of means for preventing rotation of shafts 34 and 102 except at intervals when a flask is correctly positioned in station b. For this purpose four upstanding pins 110 are positioned in spaced relation circumferentially of the dial, as clearly illustrated in Fig. 1 of the drawings. Upstanding marginal border strips 111 are also fixed to the upper face of the dial between the pins 110. The pins 110 may be termed locater pins in that they are so spaced circumferentially of the table that when one of these pins is engaged by the forked end of a locking member 112, one of the plates 15 will be accurately positioned in station b.

The element 112 is fixed to a hand lever 113 which is pivoted as at 114 on the housing 25. For actuating the lever 45, there is provided a push button 115 having a stem 116 engageable with the end 50 of this lever. This push button is so located with respect to the hand lever 113 as to be covered thereby when the hand lever is moved to a position to disengage the forked end of the element 112 from one of the pins 110. The marginal flange 111 is arranged to engage the element 112 and to prevent movement of this element inwardly and corresponding movement of hand lever 113 out of vertical alignment with the push button 115 except at times when one of the pins 110 is brought into a position to be engaged by the forked end of the element 112. A stop 117 carried by the hand lever engages the push button to limit outward swinging of the hand lever, as will be readily apparent.

For the purpose of describing the operation of the invention, the formation of a single mold will be described in detail, although it is to be understood that in actual operation, each time a platform 15 is brought to station $a$, a flask will be positioned on this platform so that at least three flasks will be positioned on the turntable at all times. Describing then the operation for the production of a single mold, a flask 120 is filled with sand, as designated by the reference character 121, the sand projecting above the top of the flask in accordance with the usual practice. This flask is positioned on the plate 15 which is at the station $a$, it being understood that the turntable will at this time be in the position illustrated in Fig. 1 of the drawings.

The handle 113 will then be swung outwardly to unlock the rotatable table or dial to permit rotation of this table, it being understood that outward swinging of the hand lever 113 will cover the push button 115 so that the latter may not be depressed. With the hand lever swung outwardly, the rotatable dial may then be rotated to position the flask in station $b$, at which time pin 110' will be brought into a position to be engaged by the locking element 112. It will be remembered that during rotation of the turntable incident to movement of the flask from station $a$ to station $b$, the upstanding marginal flange 111 will, by engaging the edge of the locking element, prevent movement of the arm 113 to a position where it uncovers push button $b$.

With the flask moved to position $b$, the table will be locked against rotation by engagement of the locking element with pin 110' and the push button may then be depressed to actuate lever 45 which in turn will raise plunger 43 to allow spring 48 to move the sleeve 37 into clutching engagement with the gear 33. As brought out before, this will cause the shafts 34 and 102 to be rotated for one revolution, at which time the rotation of these shafts will be stopped by virtue of engagement of head 42 with cam surface 47. Upon rotation of shafts 34 and 102, cams 55 will be actuated to first elevate the blocks 62 sufficiently to raise the flask to a position where the sand contacts with the stripper plate 76. At this time the cam 105 will force the cross head 80 downwardly to force the patterns through the stripper plate and into the sand 121 within the flask. After the patterns have been lowered into the sand, the rollers 56 will be engaged by the portions 72 of cams 55, and the blocks 62 will be further elevated to force the flask upwardly to thus squeeze or compress the sand in the flask. The roller 106 will next engage the lower portion of cam 105, and the cross head 80 will be elevated to raise the patterns out of the sand. The rollers 56 will next engage the depressed portion 70 of the cam 55, and the flask will be lowered.

The table may then be unlocked and rotated to position the flask at station $c$, at which time, if the mold formed is the drag, a suitably formed cope may be superposed on the drag, and these parts of the mold may be removed from the dial.

From the above it will be apparent that the invention provides a conveyor in the nature of a turntable by which a flask in which a drag or the like is to be formed may be brought into operative position with respect to a mold forming machine. The conveyor will be locked against movement during the mold forming operation, and means is provided for preventing operation of the mold forming mechanism during movement of the table. The mold forming mechanism is automatic in its operation upon starting of the actuation thereof by depression of the push button 115, and the arrangement is such that upon completion of a single mold forming operation, the actuation of the mold forming mechanism will be terminated.

While one embodiment of the inventive idea has been described with some detail, it is to be understood that the description is for the purpose of illustration only and is not definitive of the limits of the inventive idea. The right is reserved to make such changes in the details of construction and arrangement of parts as will fall within the purview of the attached claims.

What we claim as our invention is:

1. In a machine of the character described, a flask support, a pattern housing above said flask support, a movable squeeze table below said flask support, a pattern plate movably mounted within said pattern housing, and means including a plurality of cams operable to move said squeeze table and pattern plate toward each other to form a mold in said flask.

2. In a machine of the character described, a flask support, a pattern housing above said flask support, a stripper plate carried by said pattern housing, a squeeze table arranged below said flask support, a rotatable shaft, and means including a cam on said shaft operable upon rotation of said shaft to first raise said squeeze table to position said flask adjacent said pattern stripper plate and to then further raise said squeeze table to compress the sand in said flask.

3. In a machine of the character described, a flask support, a pattern plate mounted for vertical movement above said flask support, a squeeze table mounted for vertical movement below said flask support, a pair of rotatable shafts, cams on said shafts for moving said squeeze table and pattern plate toward each other to form a mold in said flask, a common drive for said shafts, and means for stopping the rotation of said shafts upon the completion of one revolution thereof.

4. In a machine of the character described, a squeeze plate, a pattern plate, and actuating means for said plates including substantially parallel shafts, cams carried by said shafts, and longitudinally movable members actuable by said cams, one of said longitudinal members being connected directly to the squeeze plate, and the other of said members being indirectly connected to the pattern plate.

5. In a machine of the character described, a rotary dial having openings therein at diametrically opposite points thereof, a reciprocating squeeze table beneath the dial and provided with blocks for insertion through the openings therein, and means for reciprocating said table so that the blocks will be projected through the openings, including a shaft, a cam on the shaft, a member suspended from the table, and means carried by said member engageable with said cam.

6. In a machine of the character described, a rotary dial having openings therein at diametrically opposite points thereof, a reciprocating squeeze table beneath the dial and provided with blocks for insertion through the openings therein, and means for reciprocating said table so that the blocks will be projected through the openings, including a shaft, a member projecting downwardly from the table, a roller carried by said member, and means on the shaft and engageable with said roller for first raising the squeeze table a slight amount and holding it in this position during a portion of the rotation of the shaft and subsequently raising the table further and holding it in this raised position for the remainder of the rotation of said shaft.

7. In a machine of the class described, a flask containing sand, a support for said flask, a pattern housing above said support, a stripper plate carried by said housing, a pattern within the housing movable downwardly relative to the stripper plate into the sand within the flask, means beneath the flask support operable to initially raise the flask to a position where the sand in the flask contacts with the stripper plate and to subsequently raise the flask to a higher position where the sand within the flask will be squeezed, and means for moving the pattern downwardly into and upwardly out of the sand within the flask.

8. In a machine of the class described, a flask containing sand, a support for said flask, a pattern housing above said support, a stripper plate carried by said housing, a pattern within the housing, a squeeze table beneath said support, means associated with the squeeze table for raising the flask relative to the stripper plate, and means associated with the housing for moving the pattern relative to the stripper plate and flask.

9. In a machine of the class described, a flask containing sand, a support for said flask, a stripper plate abve the flask support, a pattern above and movable relative to the stripper plate, and a squeeze table beneath and movable relative to the flask support.

10. In a machine of the class described, a flask containing sand, a support for said flask, a stripper plate above the flask support, a squeeze table beneath the flask support and operable to move the flask relative to the stripper plate, and a pattern above the stripper plate and movable in timed relation to the squeeze table into engagement with the sand within the flask.

11. In a machine of the class described, a flask containing sand, a support for said flask, a pattern housing above said support, a stripper plate carried by the housing, a squeeze table beneath the support operable to move the flask relative to the housing so that sand carried by the flask will be engaged by the stripper plate, and a pattern within the housing movable in timed relation to the squeeze table into engagement with the sand within the flask.

12. In a machine of the class described, a flask containing sand, a support for said flask, a pattern housing above the support, a stripper plate associated with the housing, means beneath the support operable to move the flask relative to the housing so that sand carried by the flask will be engaged by the stripper plate, a pattern within the housing, and means associated with the means aforesaid for moving the pattern relative to the stripper plate into the sand within the flask.

13. In a machine of the class described, a flask containing sand, a support for said flask, a pattern housing above the support, a stripper plate associated with the housing, a squeeze table beneath the support operable to move the flask relative to the housing so that sand carried by the flask will be engaged by the stripper plate, a pattern within the housing, and means operable in timed relation to the squeeze table for moving the pattern into the sand within the flask.

GEORGE F. YAGER.
OLIVER J. HEATH.